United States Patent
Born et al.

[11] Patent Number: 6,096,791
[45] Date of Patent: Aug. 1, 2000

[54] SULPHUR-FREE EXPANDING, HOT HARDENING SHAPED PARTS

[75] Inventors: Peter Born, Sandhausen; Klaus Hoellriegel, Wiesenbach; Rudolf Neubauer, Bammental, all of Germany

[73] Assignee: Henkel-Teroson GmbH, Duesseldorf, Germany

[21] Appl. No.: 09/297,347

[22] PCT Filed: Oct. 20, 1997

[86] PCT No.: PCT/EP97/05781

§ 371 Date: Apr. 29, 1999

§ 102(e) Date: Apr. 29, 1999

[87] PCT Pub. No.: WO98/18853

PCT Pub. Date: May 7, 1998

[30] Foreign Application Priority Data

Oct. 29, 1996 [DE] Germany .......................... 196 44 855

[51] Int. Cl.[7] .................. C08J 9/10; C08J 9/32; B01J 13/02

[52] U.S. Cl. ............................ 521/54; 264/45.1; 264/45.9; 264/46.3; 264/54; 521/82; 521/84.1; 521/87; 521/91; 521/92; 521/93; 521/94; 521/95

[58] Field of Search ................................. 521/54, 82, 84.1, 521/87, 91, 92, 93, 94, 95; 264/45.1, 45.9, 46.3

[56] References Cited

U.S. PATENT DOCUMENTS 5,700,845 12/1997 Chang ...................................... 521/150

*Primary Examiner*—Morton Foelak
*Attorney, Agent, or Firm*—Wayne C. Jaeschke; Stephen D. Harper

[57] ABSTRACT

Heat-curing, expanding mouldings based on solid polybutadiene rubber and vulcanization systems free from elemental sulfur are distinguished by the following advantageous properties: in the uncured state in which they are supplied, they have minimal rubber-elastic resilience and are readily formable. During the curing process, no unpleasant odors are given off and, after curing, a soft and elastic foam with a continuous outer skin is formed.

31 Claims, No Drawings

SULPHUR-FREE EXPANDING, HOT HARDENING SHAPED PARTS

BACKGROUND OF THE INVENTION

1. Field of the Invention

This invention relates to heat-curing expanding mouldings based on solid polybutadiene rubbers and vulcanizing agents of which the vulcanizing agent is free from elemental sulfur. The invention also relates to a process for the production of these mouldings, to their use for bonding and/or sealing metal parts and to a process for the bonding of solid surfaces, more particularly metal parts for use in vehicle construction.

2. Discussion of the Related Art

The metal parts bonded and sealed in car manufacture, particularly in car bodies, are often untreated. The adhesives/sealants used are cured at a later stage in the paint drying ovens. Before this, the bonded and sealed parts pass through cleaning, phosphating and dip-priming stages. Under the effect of the treatment chemicals used in these stages, the adhesives or sealants can be removed from the joints. Various procedures have been developed to meet these requirements, including for example thermal/inductive precuring of low-viscosity paste-form adhesives/sealants, the use of adhesives in the form of solvent-containing compositions or hotmelts, as two-component products or even as mouldings which are generally applied by hand and which are surface-tacky at the time of application. These mouldings may be present in tape form or as round cords, stampings or profiles as any cross-section.

DE-A-34 45 325 describes surface-tacky mouldings, more particularly sealant profiles, which are produced from plastisols based on PVC and/or polymeric methacrylic acid esters and/or ethylene/vinyl acetate copolymers. However, these mouldings are in need of improvement. For example, they only adhere to EC-primed metal so that, for this reason alone, they cannot be used at the "white shell" stage, i.e. cannot be applied to the non-pretreated oil-covered metal panels. Since it is known that plastisol compositions retain their thermoplastic character, even after gelling, corresponding bonds or seals lose their mechanical strength on exposure to heat.

To overcome the last two technical problems, heat-curing mouldings based on rubber have been in use for several years. They generally consist of a mixture of liquid and optionally solid rubbers based on polyolefins, more particularly on diene homopolymers and copolymers. As their curing system, these rubber mouldings contain a vulcanization system based on elemental sulfur and optionally accelerating vulcanization auxiliaries. In principle, the composition of these mouldings is similar to that of the pumpable paste-form products described, for example, in JP-A-93059345 or in DE-A-38 35 740. Other examples of heat-curing, expanding and non-expanding adhesives based on sulfur-vulcanizing rubber adhesives in solvent-containing or solvent-free form are described in EP-A-476 224, EP-A-643 117 and in hitherto unpublished DE-A-195 18 673. JP-A49099643 describes readily extrudable vulcanizable rubber compositions which contain Li-catalyzed butadiene rubber, i.e. rubber with a high trans-1,4-content, and of which the vulcanization system consists of elemental sulfur and p-benzoquinone dioxime. In addition, these compositions have a very high content of carbon black. For these reasons, the rubber compositions in question are unsuitable for the production of the heat-curing expanding mouldings according to the present invention, i.e. are unsuitable as white shell adhesives and sealants in car production.

Heat-curing expanding mouldings based on solid and, in some cases, even liquid rubbers and vulcanizing agents containing elemental sulfur belong to the prior art although, as far as applicants are aware, they have not been published in patents. These known mouldings generally consist essentially of a mixture of solid butyl rubber, precrosslinked solid butyl rubber, solid natural rubber and extender oils, fillers, tackifying resins, pigment black, coupling resins and a vulcanization system based on elemental sulfur and optionally organic expanding agents.

Although the heat-curing mouldings just mentioned are already wide-spread in practice, they are in need of significant improvement in certain respects:

The cured products have a typical "rubber odor" which is presumably attributable to the elemental sulfur used in the vulcanization or crosslinking system; this odor is particularly unpleasant during curing.

In the untreated state in which they are supplied, the preformed/dimensioned profiles/stampings for manual application are supposed to have minimal rubber-elastic resilience and to be readily formable so that they may be adapted without significant effort to the metal parts to be joined and completely fill the gaps with ease.

Excessive resilience of the mouldings should not result in unfavorable tensions and deformation of the metal parts being "fixed" in the curing process.

A soft, elastic foam with a continuous outer skin should be formed after curing.

The properties mentioned above are also particularly important in the so-called sandwich bonding of metal parts with underlying reinforcing frames or supports so that the deformation of the metal parts thus bonded is reduced to a minimum. This is particularly important for the large-surface metal parts of a car body of which the outside remains visible so that the optical impression of the high-gloss paint surface of the finished body is not marred by the so-called "read-through" effect.

SUMMARY OF THE INVENTION

Accordingly, the problem addressed by the present invention was to provide heat-curing mouldings which would be able to expand during the curing process without giving off an unpleasant "rubber odor". In addition, the preformed parts would only have minimal rubber-elastic resilience and would be readily formable in the uncured state in which they are supplied for manual application and a soft, elastic foam with a continuous outer skin would be formed after curing. In addition, the composition of the vulcanization system would be such that the broad temperature ranges available for stoving of the EC lacquer in car production could be used for the curing and expansion process. The oven temperatures in question are generally between 150° C. and 190° C. although peak temperatures of up to about 220 to 240° C. can also occur.

According to the invention, this problem has been solved by heat-curing expanding mouldings which use solid butadiene rubber as the polymer base and which contain vulcanizing agents free from elemental sulfur. In the context of the present invention, the expression "solid polybutadiene rubber" encompasses homopolymers and copolymers of butadiene with a molecular weight of >20,000 and, generally >80,000, molecular weights in the range from 150,000 to 400,000 being particularly preferred. In one preferred embodiment of the invention, more than 70% by weight of the polybutadiene rubber consists of cis-1,4-polybutadiene, solid polybutadienes with 80% or even 98% of cisconfigured double bonds being particularly suitable. Although solid rubbers based on butadiene homopolymers are particularly preferred for the mouldings according to the invention, copolymers thereof with styrene are also suitable. The butyl rubbers (IIR), natural rubber (NR), precrosslinked butyl rubber, synthetic polyisoprenes, EPDM rubber or chlorobutyl rubbers used in the prior art have very high rubber-elastic resilience in the uncured state in which they are supplied and, accordingly, are not readily formable so that complete wetting or filling of the gaps to be sealed remains unsatisfactory. In addition, stresses are frequently developed during curing in the oven on account of the high resilience of these rubbers.

The use of a vulcanization system free from elemental sulfur in accordance with the invention enables a soft elastic foam with a continuous outer skin to be formed during the curing process and prevents the "rubber vulcanization".

DETAILED DESCRIPTION OF THE INVENTION

The heat-curing and foamable rubber mouldings according to the invention contain at least one of the following substances:

one or more solid rubbers based on polybutadiene or copolymers thereof, vulcanizing agents which are free from elemental sulfur, vulcanization accelerators, catalysts, fillers, tackifiers and/or coupling agents, blowing agents, extender oils, antiagers, flow aids.

The solid rubbers are preferably cis-1,4-polybutadiene homopolymers with a cis content of more than 70% and preferably between 80 and 98%. The molecular weight of the solid rubber is at least 20,000 and preferably above 80,000, molecular weights in the range from 200,000 to 400,000 being particularly preferred. The percentage content of the solid rubber in the composition as a whole depends on the required properties of the mouldings before and after curing. It varies from 5 to 50% by weight of the formulation as a whole and is preferably in the range from 20 to 30% by weight solid rubber.

The crosslinking or curing reaction of the rubber composition and its foaming have a crucial bearing on the adhesion and sealing function of the moulding so that the vulcanization system and the blowing agents have to be selected and coordinated with particular care. Only those vulcanization systems which contain no elemental sulfur are suitable. In one particular embodiment, the vulcanization system consists of quinones, p-benzoquinone dioxime, p-nitrosobenzene and dinitrosobenzene, p-benzoquinone dioxime being preferred. In principle, however, peroxide-based vulcanization systems may also be used. The vulcanization system may optionally contain organic accelerators such as, for example, polyfunctional amines, dithiocarbamates (in the form of their ammonium or metal salts), xanthogenates, thiuram compounds (monosulfides and disulfides), thiazole compounds, aldehyde/amine accelerators (for example hexamethylene tetramine) and guanidine accelerators or dibenzothiazyl disulfide or diphenyl guanidine. The content of vulcanizing agents is between 0.02 and 5% by weight and preferably between 0.05 and 0.24% by weight. Zinc compounds may also be added as accelerators and may be selected from the zinc salts of fatty acids, zinc dithiocarbamates, basic zinc carbonates and, in particular, fine-particle zinc oxide. The percentage content of active zinc oxide in the composition as a whole is between 0.5 and 10% by weight and preferably between 2 and 5% by weight.

In principle, any of the usual blowing agents may be used to achieve foaming during the curing process although organic blowing agents from the class of azo compounds, N-nitroso compounds, sulfonyl hydrazides or sulfonyl semi-carbazides are preferably used. Azo-bis-isobutyronitrile and, in particular, azodicarbonamide are mentioned as examples of the azo compounds which may be used in accordance with the invention. Dinitrosopentamethylene tetramine is mentioned as an example of a suitable nitroso compound, 4,4'-oxy-bis-(benzenesulfonic acid hydrazide), diphenyl sulfone-3,3'-disulfohydrazide and benzene-1,3-disulfohydrazide are mentioned as examples of sulfohydrazides and p-toluene sulfonyl semicarbazide is mentioned as an example of a semicarbazide. Although the blowing agents mentioned above are particularly preferred, so-called hollow microspheres, i.e. non-expanded thermoplastic polymer powders, impregnated or filled with low-boiling organic liquids may also be used in their place. Such micro-spheres are described, for example, in EP-A-559 254, in EP-A-586 541 and in EP-A-594 598. These microspheres may optionally be combined in any ratio with the blowing agents mentioned above.

If necessary, the mouldings according to the invention may contain tackifiers and/or coupling agents. Suitable tackifiers and/or coupling agents are, for example, hydrocarbon resins, phenolic resins, terpene/phenol resins, resorcinol resins or derivatives thereof, modified or unmodified resin acids or esters (abietic acid derivatives), polyamines, polyaminoamides, anhydrides and anhydride-containing copolymers. The addition of polyepoxy resins in small quantities can also improve adhesion to some substrates. In this case, however, solid epoxy resins with a molecular weight of >700 in finely ground form are preferably used. If tackifiers and/or coupling agents are used, the type and quantity used is essentially determined by the substrate to which the mouldings are applied. Typical tackifying resins (tackifiers), for example terpene/phenol resins or resin acid derivatives, are used in concentrations of 5 to 20% by weight while typical coupling agents, such as polyamines, polyaminoamides or phenolic resins or resorcinol derivatives, are used in quantities of 0.1 to 10% by weight.

To establish consistency before curing and mechanical properties after curing, the mouldings according to the invention may also contain extender oils or plasticizers. Aliphatic, aromatic or naphthenic oils are mainly used for this purpose, optionally through the co-use of low molecular weight polybutene or polyisobutylene. If extender oils are added, they are used in quantities of 2 to 20% by weight.

The fillers may be selected from a large number of materials, including in particular chalks, natural or ground calcium carbonates, calcium/magnesium carbonates, silicates, heavy spar, graphite and—in small quantities—carbon black. It may be advisable for the fillers to be at least partly surface-pretreated. In the case of the various calcium carbonates or chalks in particular, coating with stearic acid has proved to be useful to reduce the moisture introduced and to reduce the sensitivity of the cured composition to moisture. The compositions according to the invention may optionally contain between 1 and 10% by weight of calcium oxide. The total filler content of the formulation may be between 10 and 70% by weight and is preferably between 25 and 60% by weight.

Conventional stabilizers or antiagers, for example sterically hindered phenols or amine derivatives, may be used to prevent thermal, thermo-oxidative or ozone degradation of the compositions according to the invention. These stabilizers are used in quantities of typically 0.1 to 5% by weight and preferably 0.1 to 2% by weight.

The heat-curing foamable mouldings or stampings according to the invention are preferably used at the so-called white shell stage of car production. The preformed, uncured mouldings or stampings are used for bonding and sealing linings to fitted parts, for example bonnets, boot lids and doors. Another preferred application is the use of the mouldings between the roof skin and the roof supports and in the fitting of sliding-roof constructions or the sealing of mudguards. To this end, the correspondingly shaped mouldings in the form of round cords, tapes or profiles of any cross-section are either removed from large rolls and cut to the appropriate length in situ or sections or stampings cut to size at the production stage are used. The profiled sealing tapes and/or cords may optionally contain a so-called inner "core" i.e. a filament to improve processability in the uncured state. One process for the production of such mouldings is described, for example, in DE-C-28 14 217. The stampings may optionally contain spacers so that, when the metal parts thus bonded are pressed together, they are kept at a minimum distance apart by the spacers. This process is described, for example, in DE-A-35 00 924.

The following Examples are intended to illustrate the invention without limiting it in any way.

The compositions shown below were mixed in an evacuable laboratory kneader until they were homogeneous. Unless otherwise indicated, all parts in the Examples are parts by weight. Subsequent forming into round cords or tapes was carried out in a laboratory extruder with a correspondingly shaped nozzle, the compositions being extruded onto a release paper.

EXAMPLE 1

Invention

| | |
|---|---|
| Polybutadiene | 25.00 |
| Naphthenic mineral oil | 15.00 |
| Zinc oxide, active | 3.00 |
| Azodicarbonamide, activated | 1.00 |
| Antioxidant | 0.50 |
| Benzoquinone dioxime | 0.15 |
| Lampblack | 0.50 |
| Calcium carbonate | 54.85 |

EXAMPLE 2

Comparison Example

| | |
|---|---|
| Butyl rubber, solid | 2.00 |
| Precrosslinked butyl rubber, solid | 12.00 |
| Natural rubber, solid | 19.50 |
| Naphthenic mineral oil | 9.00 |
| Liquid polyisobutylene (Oppanol B10, BASF) | 8.00 |
| Azodicarbonamide, activated | 1.70 |
| Sulfur | 0.50 |
| Tetramethyl thiuram disulfide | 0.30 |
| Zinc oxide, active | 0.15 |
| Salicylic acid, crystalline, powder | 1.50 |
| Lampblack | 1.30 |
| Alkyl phenol resin | 2.60 |
| Glycerol ester of a hydrogenated rosin | 2.60 |
| Talcum | 36.05 |
| Coumarone/indene resin | 2.80 |

Mouldings of Examples 1 and 2 were subjected to the following

| Test (Comparison) | Example 1 | Example 2 |
|---|---|---|
| Before curing | | |
| Penetration[1] | 50 | 50 |
| Breaking elongation[2] [%] | 288 | 1136 |
| Tensile strength[2] [N/m$^2$] | 0.036 | 0.066 |
| After curing[3] | | |
| Breaking elongation[2] [%] | 628 | 449 |
| Expansion [%] | 66 | 57 |

[1] ASTM D5, Cone 150 g/20° C., 6 secs.
[2] S2 standard test piece, DIN 53504, moulding 3 mm thick, tear rate 100 mm/minute.
[3] Curing 30 mins./180° C.

It is clear from the test results that, before curing, the mouldings according to the invention have a very much lower tensile strength and, in particular, breaking elongation—as required—for the same consistency (penetration), so that their rubber-elastic resilience is very slight. After curing, both expansion and breaking elongation are significantly higher—as required—than in the Comparison Example corresponding to the prior art. During the curing process, the mouldings corresponding to the prior art gave off the typical "rubber vulcanization odor" whereas the mouldings according to the invention gave off no such odor.

What is claimed is:

1. A rubber composition useful for preparing a heat-curing expanding molding, said rubber composition being comprised of:
   (a) 5 to 50%, based on the weight of the rubber composition as a whole, of one or more solid rubbers comprised of cis-1,4-polybutadiene having a molecular weight above 80,000 and a cis content of more than 70%;
   (b) a vulcanization system free from elemental sulfur, said vulcanization system being comprised of 0.02 to 5%, based on the weight of the rubber composition as a whole, of one or more vulcanizing agents and, optionally, one or more vulcanization accelerators or catalysts;
   (c) 10 to 70%, based on the weight of the rubber composition as a whole, of one or more fillers;
   (d) one or both of
      (i) 5 to 20%, based on the weight of the rubber composition as a whole, of one or more tackifiers;
      (ii) 0.1 to 10%, based on the weight of the rubber composition as a whole, of one or more coupling agents;
   (e) 2 to 20%, based on the weight of the rubber composition as a whole, of one or more extender oils or plasticizers; and
   (f) 0.1 to 5%, based on the weight of the rubber composition as a whole, of one or more antiagers;

(g) one or more blowing agents.

2. The rubber composition of claim 1 additionally comprising one or more flow aids.

3. The rubber composition of claim 1 wherein the cis content of the cis-1,4-polybutadiene is between 80 and 98%.

4. The rubber composition of claim 1 wherein more than 70% of the solid rubbers is comprised of cis-1,4-polybutadiene.

5. The rubber composition of claim 1 wherein the cis-1, 4-polybutadiene has a molecular weight in the range from 200,000 to 400,000.

6. The rubber composition of claim 1 wherein the vulcanizing agents are selected from the group consisting of peroxides one duinone oximes.

7. The rubber composition of claim 1 additionally comprising expanding hollow microspheres.

8. The rubber composition of claim 1 wherein the solid rubbers comprise from 20 to 30% of said rubber composition.

9. The rubber composition of claim 1 wherein the vulcanizing agents comprise from 0.05 to 0.24% of said rubber composition.

10. The rubber composition of claim 1 wherein at least one zinc compound is present as an accelerator.

11. The rubber composition of claim 10 wherein the zinc compound is selected from the group consisting of zinc salts of fatty acids, zinc dithiocarbamates, basic zinc carbonates, and zinc oxide.

12. A rubber composition useful for preparing a heat-curing expanding molding, said rubber composition being comprised of:

(a) 20 to 30%, based on the weight of the rubber composition as a whole, of one or more solid rubbers, wherein more that 70% of said solid rubbers is comprised of cis-1,4-polybutadiene having a molecular weight in the range from 200,000 to 400,000 and a cis content between 80 and 98%;

(b) a vulcanization system free from elemental sulfur, said vulcanization system being comprised of (i) 0.05 to 0.24%, based on the weight of the rubber composition as a whole, of one or more vulcanizing agents, wherein at least one of said vulcanizing agents is selected from the group consisting of peroxides, quinones and quinone oximes and (ii) one or more vulcanization accelerators or catalysts;

(c) 25 to 60%, based on the weight of the rubber composition as a whole, of one or more fillers, wherein at least one of said fillers is selected from the group consisting of chalks, calcium carbonates, calcium/magnesium carbonates, silicates, heavy spar, graphite, and calcium oxide;

(d) one or both of
  (i) 5 to 20%, based on the weight of the rubber composition as a whole, of one or more tackifiers;
  (ii) 0.1 to 10%, based on the weight of the rubber composition as a whole, of one or more coupling agents;

(e) 2 to 20%, based on the weight of the rubber composition as a whole, of one or more extender oils or plasticizers;

(f) 0.1 to 2%, based on the weight of the rubber composition as a whole, of one or more antiagers; and (g) one or more blowing agents selected from the group consisting of azo compounds, N-nitroso compounds, sulfonyl hydrazides, sulfonyl semicarbazides, and expanding hollow microspheres.

13. The rubber composition of claim 12 additionally comprising one or more flow aids.

14. The rubber composition of claim 12 wherein at least one of the vulcanization accelerators or catalysts is a zinc compound selected from the group consisting of zinc salts of fatty acids, zinc dithiocarbamate, basic zinc carbonates, and zinc oxide.

15. The rubber composition of claim 12 wherein zinc oxide is present at a concentration of between 2 and 5%, based on the weight of the rubber composition as a whole.

16. The rubber composition of claim 12 wherein azodicarbonamide is present as one of the blowing agents.

17. A process for producing a heat-curing expanding molding comprising the steps of (a) extruding the rubber composition of claim 1 to form the heat curing expanding molding; and (b) applying the heat-curing expanding molding to a release paper.

18. The process of claim 17 wherein the heat-curing expanding molding is in a form selected from the group consisting of flat tapes, cords and profiles.

19. The process of claim 17 where the heat-curing expanding molding has a round, rectangular, or triangular cross-section.

20. The process of claim 17 wherein the heat-curing expanding molding is stamped after step (a) and before step (b) to form a shaped part.

21. A method of bonding or sealing metal parts comprising using the heat-curing expanding molding produced by the process of claim 17 to bond or seal said metal parts.

22. The method of claim 21 wherein said metal parts are used in vehicle construction.

23. A process for producing a heat-curing expanding molding comprising (a) preparing the rubber composition of claim 12 using intensive shearing;

(b) extruding the rubber composition through a nozzle to form the heat-curing expanding molding in a form selected from the group consisting of flat tapes, cords and profiles;

(c) applying the heat-curing expanding molding to a release paper.

24. The process of claim 23 wherein the heat-curing expanding molding has a round, rectangular or triangular cross-section.

25. The process of claim 23 wherein step (a) is performed in vacuo.

26. The process of claim 23 wherein the heat-curing expanding molding is stamped after step (b) and before step (c) to form a shaped part.

27. A method of bonding or sealing metal parts comprising using the heat-curing expanding molding produced by the process of claim 23 to bond or seal said metal parts.

28. The method of claim 27 wherein said metal parts are used in vehicle construction.

29. The method of claim 27 wherein the heat-curing expanding molding is cured at a temperature of from 150° C. to 240° C.

30. A soft, elastic foam obtained by curing and expanding the rubber composition of claim 1.

31. A soft, elastic foam obtained by curing and expanding the rubber composition of claim 12.

* * * * *

UNITED STATES PATENT AND TRADEMARK OFFICE
CERTIFICATE OF CORRECTION

PATENT NO. : 6,096,791
DATED : August 1, 2000
INVENTOR(S) : Born et al.

It is certified that error appears in the above-identified patent and that said Letters Patent is hereby corrected as shown below:

<u>Column 7,</u>
Line 14, delete "one duinone", and insert therefore -- , quinones and quinone --.
Line 34, delete "that", and insert therefore -- than --.

Signed and Sealed this

Twelfth Day of October, 2004

JON W. DUDAS
*Director of the United States Patent and Trademark Office*